(12) United States Patent
Matsumoto (10) Patent No.: US 9,196,070 B2
(45) Date of Patent: Nov. 24, 2015

(54) IMAGE PROCESSING APPARATUS THAT GENERATES OMNIFOCAL IMAGE, IMAGE PROCESSING METHOD, AND STORAGE MEDIUM

(71) Applicant: CASIO COMPUTER CO., LTD., Shibuya-ku, Tokyo (JP)

(72) Inventor: Kosuke Matsumoto, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 143 days.

(21) Appl. No.: 14/049,065

(22) Filed: Oct. 8, 2013

(65) Prior Publication Data
US 2014/0105520 A1      Apr. 17, 2014

(30) Foreign Application Priority Data

Oct. 12, 2012  (JP) ................................ 2012-227052

(51) Int. Cl.
    *G06K 9/36*      (2006.01)
    *G06T 11/60*     (2006.01)
    *G06T 7/00*      (2006.01)

(52) U.S. Cl.
    CPC ............... *G06T 11/60* (2013.01); *G06T 7/0069* (2013.01); *G06T 2207/10148* (2013.01)

(58) Field of Classification Search
    CPC ............ G06T 11/60; G06T 2207/10056; G06T 2207/10148; G02B 27/365; G02B 27/0075; G02B 3/0056; H01L 27/14627; H04N 13/0235; H04N 5/2173
    USPC ......................................................... 382/284
    See application file for complete search history.

(56) References Cited

U.S. PATENT DOCUMENTS

| 2011/0169985 A1* | 7/2011 | Cooper ........................ 348/241 |
| 2011/0261050 A1  | 10/2011 | Smolic et al. |
| 2012/0019686 A1  | 1/2012 | Manabe |
| 2012/0148109 A1* | 6/2012 | Kawamura et al. ........... 382/106 |
| 2014/0009572 A1* | 1/2014 | Matsumoto et al. ............ 348/36 |

FOREIGN PATENT DOCUMENTS

| JP | 2007-282152 A | 10/2007 |
| JP | 5146498 B2 | 2/2013 |
| KR | 1020110059803 A | 6/2011 |

OTHER PUBLICATIONS

Korean Office Action (and English translation thereof) dated Mar. 6, 2015, issued in counterpart Korean Application No. 10-2013-0117949.

* cited by examiner

*Primary Examiner* — Ali Bayat
(74) *Attorney, Agent, or Firm* — Holtz, Holtz, Goodman & Chick PC

(57) ABSTRACT

The captured image acquisition unit 52 acquires the data of the subject focusing image P1 and the non-subject focusing image P2 with different focal points. The image depth map generation unit 91 generates the subject depth map DMP1 and the non-subject depth map DMP2 that represent a distance relationship of a subject in an image for every pixel for each of the subject focusing image P1 and the non-subject focusing image P2 acquired. The composition depth map generation unit 92 performs predetermined processing on the subject depth map DMP1 and the non-subject depth map DMP2 thus generated to generate the composition depth map DMP3. The image composition unit 55 composites the data of the subject focusing image P1 with the data of the non-subject focusing image P2 based on the composition depth map DMP3 thus generated to generate the data of the omnifocal image P3.

9 Claims, 5 Drawing Sheets

FIG.4

IMAGE PROCESSING APPARATUS THAT GENERATES OMNIFOCAL IMAGE, IMAGE PROCESSING METHOD, AND STORAGE MEDIUM

This application is based on and claims the benefit of priority from Japanese Patent Application No. 2012-227052, filed on 12 Oct. 2012, the content of which is incorporated herein by reference.

BACKGROUND OF THE INVENTION

1. Field of the Invention

The present invention relates to an image processing apparatus, an image processing method, and a storage medium.

2. Related Art

Conventionally, in a case of photographing an image by focusing on all of subjects positioned from forwards to backwards within a frame (hereinafter, referred to as "omnifocal image"), a special lens such as an ultra deep lens (commonly known as a "bug's-eye lens") has been used.

However, the bug's-eye lens is quite long and thus not convenient for carrying.

Therefore, technology has been disclosed in Japanese Unexamined Patent Application, Publication No. 2007-282152 that generates data of an omnifocal image by an image capture apparatus equipped with a normal lens photographing substantially at the same time subjects in an identical frame at a plurality of focusing positions by a single shutter operation, and then compositing the data of a plurality of captured images thus acquired.

SUMMARY OF THE INVENTION

An image processing apparatus according to a first aspect of the present invention includes:

an acquisition unit that acquires data of a plurality of images with different focal points;

a first map generation unit that generates a depth map that represents a distance relationship of a subject, for each of a plurality of images acquired by the acquisition unit, in an image for each of a predetermined number of pixels;

a second map generation unit that generates a new depth map by performing predetermined processing on a plurality of depth maps generated by the first map generation unit; and an image composition unit that composites data of the plurality of images for each pixel according to a ratio of composition for each pixel designated by the new depth map generated by the second map generation unit, and generates data of an omnifocal image.

An image processing method according to a second aspect of the present invention includes:

an acquisition step of acquiring data of a plurality of images with different focal points;

a first map generation step of generating a depth map that represents a distance relationship of a subject, for each of a plurality of images acquired by the acquisition step, in an image for each of a predetermined number of pixels;

a second map generation step of generating a new depth map by performing predetermined processing on a plurality of depth maps generated by the first map generation step; and an image composition step of compositing data of the plurality of images for each pixel according to a ratio of composition for each pixel designated by the new depth map generated by the second map generation step, and generating data of an omnifocal image.

A non-transitory storage medium encoded with a computer-readable program according to a third aspect of the present invention that enables a file processing apparatus executes:

an acquisition function that acquires data of a plurality of images with different focal points;

a first map generation function that generates a depth map that represents a distance relationship of a subject, for each of a plurality of images acquired by the acquisition function, in an image for each of a predetermined number of pixels;

a second map generation function that generates a new depth map by performing predetermined processing on a plurality of depth maps generated by the first map generation function; and an image composition function that composites data of the plurality of images for each pixel according to a ratio of composition for each pixel designated by the new depth map generated by the second map generation function, and generates data of an omnifocal image.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

In the following, an image capture apparatus according to an embodiment of the present invention is explained with reference to the drawings.

Figure 1:
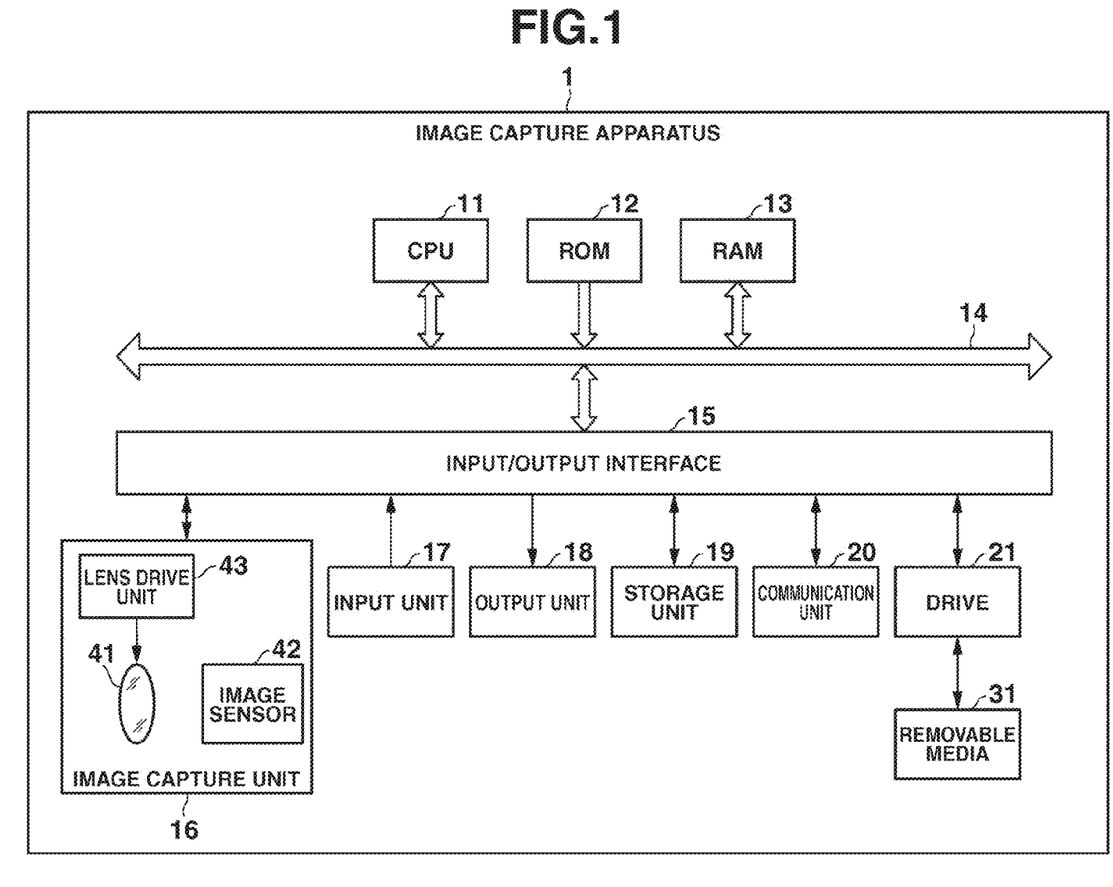
FIG. 1 is a block diagram showing a hardware configuration of an image capture apparatus according to an embodiment of the present invention.

FIG. 1 is a block diagram showing a hardware configuration of an image capture apparatus 1 according to an embodiment of the present invention.

The image capture apparatus 1 is configured as, for example, a digital camera.

The image capture apparatus 1 includes a CPU (Central Processing Unit) 11, ROM (Read Only Memory) 12, RAM (Random Access Memory) 13, a bus 14, an Input/Output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit 41, an image sensor 42, and a lens drive unit 43.

In order to photograph a subject, the optical lens unit 41 is configured by a lens such as a focus lens and a zoom lens for condensing light.

The focus lens is a lens that is driven by the lens drive unit 43 (described later) and forms an image of a subject on the light receiving surface of the image sensor 42 (described later). The zoom lens is a lens that causes the focal length to freely change in a certain range.

The image sensor 42 is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit 41 forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16. Such an output signal of the image capture unit 16 is data of a captured image. Data of a captured image is supplied to the CPU 11, etc. as necessary. Furthermore, to the data of a captured image is added information of photographing order and information of focusing position at the time of photographing. It should be noted that, unless otherwise noted, data of a captured image to which meta data is added is referred to as merely "data of a captured image".

The lens drive unit 43 focuses on a predetermined subject by driving a focus lens of the optical lens unit 41 based on the result of autofocus (AF) processing by the CPU 11 to change a focusing position.

In the image capture apparatus 1 having such a focus mechanism, it is possible to photograph an image by focusing on a subject on a near side, i.e. the shortest photographing distance direction, and it is also possible to photograph with the target at a far distance so that focusing adjustment is unnecessary, i.e. the infinite distance direction.

Furthermore, the lens drive unit 43 drives so as to make it possible to perform "focus bracketing photography" (described later) that captures images sequentially with different focusing positions while changing positions decided by the AF processing.

The input unit 17 is configured by various buttons and inputs a variety of information in accordance with instruction operations by the user.

The output unit 18 is configured by the display unit, a speaker, and the like, and outputs images and sound.

The storage unit 19 is configured by hard disk, DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Next, a functional configuration for executing omnifocal image generation processing among the functional configurations of the image capture apparatus 1 is explained.

"Omnifocal image generation processing" refers to a sequence of processing from compositing data of a plurality of captured images with different focal points to generating and outputting data of the omnifocal image.

Figure 2:
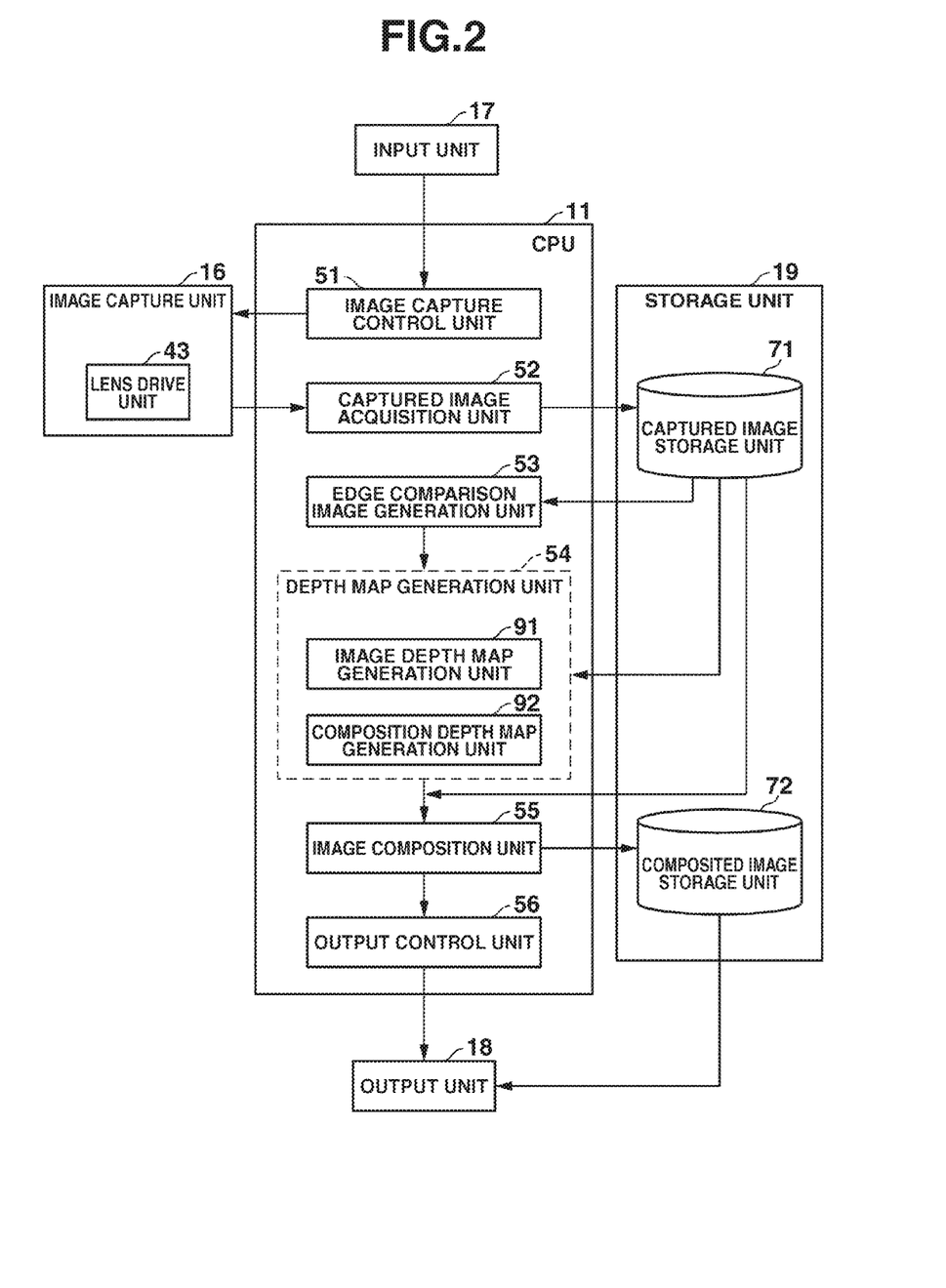
FIG. 2 is a functional block diagram showing a functional configuration for executing omnifocal image generation processing, among the functional configurations of the image capture apparatus of FIG. 1.

FIG. 2 is a functional block diagram showing a functional configuration for executing omnifocal image generation processing among the functional configurations of the image capture apparatus 1.

Figure 3:
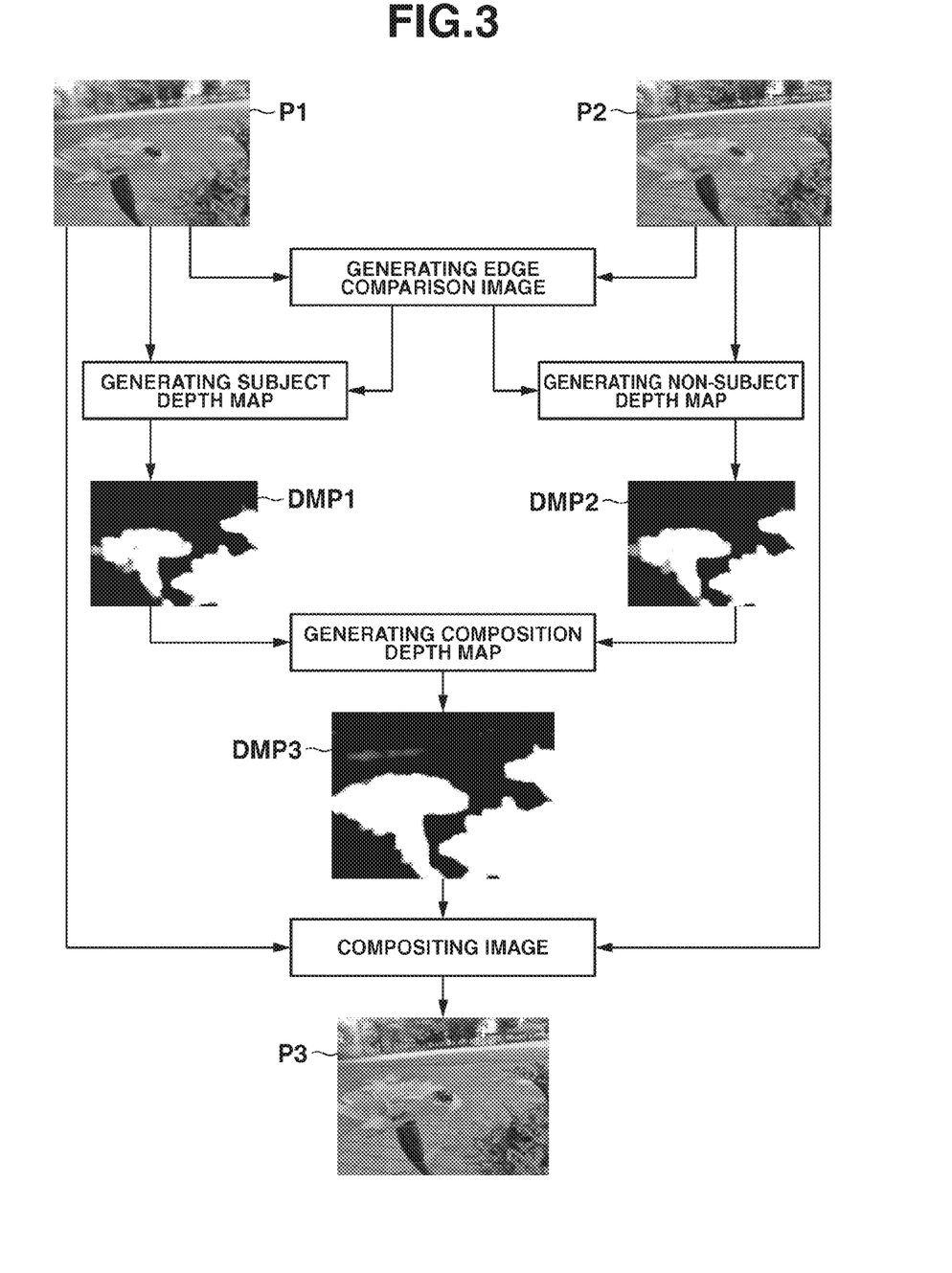
FIG. 3 is a schematic diagram for explaining a specific example of generating data of an omnifocal image.

FIG. 3 is a schematic diagram for explaining a specific example of generating data of an omnifocal image.

As shown in FIG. 2, in a case of the image capture apparatus 1 executing the omnifocal image generation processing, an image capture control unit 51, a captured image acquisition unit 52, an edge comparison image generation unit 53, a depth map generation unit 54, an image composition unit 55, and an output control unit 56 function in the CPU 11.

Furthermore, a captured image storage unit 71 and a composited image storage unit 72 are provided as a certain area of the storage unit 19.

The captured image storage unit 71 stores data of a captured image outputted from the image capture unit 16.

The composited image storage unit 72 stores data of an omnifocal image composited by the image composition unit 55.

For the image capture apparatus 1 having such a functional configuration, an example is explained in which data of an omnifocal image is generated by performing the focus bracketing photography with a flower blooming in a park as a subject along with the park as a landscape for background.

Furthermore, since it is assumed that the wind is blowing upon photographing in this example, the explanations below are provided for a case in which the flower sways in the wind, and thus photographed as a moving body.

The image capture control unit 51 controls to capture an image at the image capture unit 16 including the lens drive unit 43, etc. based on the instructions for image capturing from the input unit 17. More specifically, the image capture control unit 51 controls the image capture unit 16 including the lens drive unit 43, etc. so as to perform focus bracketing photography.

Here, "focus bracketing photography" refers to a technique of consecutively shooting a plurality of captured images at a position of focusing on an arbitrary subject (a predetermined focusing position) and at positions in which the focus is dislocated back and forth by driving to adjust the lens drive unit 43 (a focus position dislocated from the predetermined focus position), respectively.

It should be noted that, in the focus bracketing photography of the present embodiment, the image capture control unit 51 controls the image capture unit 16 so as to first perform photographing at a focusing position of focusing on a subject (hereinafter, referred to as "subject focusing image photography"), and then to perform photographing at a focus position of focusing on a background of the subject (hereinafter, referred to as "non-subject focusing image photography") so that data of two captured images used for generating data of an omnifocal image is acquired by the image capture processing.

In the present embodiment, as shown in the example of FIG. 3, a captured image P1 acquired by the subject focusing image photography (hereinafter, referred to as "subject focusing image P1") becomes an image in which a flower is in focus as the subject and the park as the background is blurred.

Furthermore, in the present embodiment, a captured image P2 acquired by the non-subject focusing image photography (hereinafter, referred to as "non-subject focusing image P2") becomes an image in which the park is in focus as the background of the subject and the flower as the subject is blurred.

An omnifocal image in the present embodiment may be an omnifocal image composed of at least two images of a subject focusing image and a non-subject focusing image.

The captured image acquisition unit 52 acquires data of captured images outputted from the image capture unit 16.

Furthermore, the captured image acquisition unit 52 initially acquires from the image capture unit 16 data of the subject focusing image P1 in which a subject is in focus, by way of the subject focusing image photography.

Then, the captured image acquisition unit 52 acquires from the image capture unit 16 data of the non-subject focusing image P2 in which the background of the subject is in focus, and thus the flower as the subject is blurred, by way of the non-subject focusing image photography. In this way, in the present embodiment, the data of two captured images with different focal points, i.e. the data of multifocal captured images (the subject focusing image P1 and the non-subject focusing image P2) is acquired and data of an omnifocal image is generated.

Furthermore, in the present embodiment, as shown in the example of FIG. 3, since the captured image acquisition unit 52 performs photographing to include the flower (a moving body) swayed by the wind, data of captured images of which the positions of the flower within an angle of field are different (the subject focusing image P1 and the non-subject focusing image P2) is acquired upon the subject focusing image photography and upon the non-subject focusing image photography, respectively.

Then, the captured image acquisition unit 52 outputs data of the captured images acquired (the subject focusing image P1 and the non-subject focusing image P2) to the captured image storage unit 71.

The edge comparison image generation unit 53 generates an edge comparison image composed of an edge map comparing edge strengths using the subject focusing image P1 and the non-subject focusing image P2 acquired by the captured image acquisition unit 52. This edge comparison image is used for identifying the distance to a photographing target based on the change of the edge, and then a depth map is generated which corresponds to the shape of the photographing target, based on the identified distance of the photographing target.

The depth map generation unit 54 identifies the distance to the photographing target based on the edge comparison image generated by the edge comparison image generation unit 53 and, for example, generates the depth maps DMP1, DMP2, and DMP3 constituted by the relative distance from the image capture apparatus 1 to the target in binary values as a positional relationship of a subject and a background in an image. The depth map generation unit 54 is used for distinguishing a subject from a non-subject in the edge comparison image. It should be noted that, in the present embodiment, the depth maps DMP1, DMP2, and DMP3 thus generated are configured to assume binary values, where, the map is treated as "background" if the value is "0" and the map is treated as "subject" if the value is "1". Therefore, in the depth maps DMP1, DMP 2, and DMP3, as shown in the example of FIG. 3, a background portion with the value "0" is a portion shown in black (dark color) and a subject portion with the value "1" is a portion shown in white (bright color). In a case of the value "0" being black (dark color), it indicates that a photographing target is far and in a case of the value "1" being white (bright color), it indicates that a photographing target is close. More specifically, since regions corresponding to the flower and grass next to the flower are in white (bright color), it is identified that the flower is close to the grass.

It should be noted that, for the generation of the depth maps, it may be configured that processing is performed by one pixel unit or performed by a predetermined block unit.

The depth map generation unit 54 includes an image depth map generation unit 91 that generates depth maps of images from the plurality of images acquired (in the present embodiment, depth maps of two images) and a composition depth map generation unit 92 that generates one depth map for image composition from a plurality of depth maps of images.

The image depth map generation unit 91 generates the depth map DMP1 (hereinafter referred to as "subject depth map DMP1") that corresponds to the shape of a photographing target included in the subject focusing image P1 using the edge comparison image generated by the edge comparison image generation unit 53 and the subject focusing image P1 acquired by the captured image acquisition unit 52.

Furthermore, the image depth map generation unit 91 generates the dept map DMP2 (hereinafter referred to as "subject depth map DMP2") that corresponds to the shape of a photographing target included in the non-subject focusing image P2 using the edge comparison image generated by the edge comparison image generation unit 53 and the non-subject focusing image P2 acquired by the captured image acquisition unit 52.

The composition depth map generation unit 92 generates a composition depth map DMP3 by performing processing of OR operation on the two depth maps of images of the non-subject depth map DMP1 and the non-subject depth map DMP2 generated by the image depth map generation unit 91.

Here, "OR operation" is performed as a selective operation on pixel values and performed in a way of calculating "0" only in a case in which both inputs of pixels to be calculated are "0". In other words, in the present embodiment, the composition depth map DMP3 takes the value of "0" only in a case in which both depth maps of the non-subject depth map DMP1 and the non-subject depth map DMP2 take the value of "0".

In other words, in the present embodiment, a generation method by way of the OR operation is used in order to use binary depth maps.

The image composition unit 55 composites the subject focusing image P1 with the non-subject focusing image P2 based on the composition depth map DMP3 generated by the composition depth map generation unit 92 so as to generate data of an omnifocal image P3. In the present embodiment, the image composition unit 55 performs semi-transparent composition (image composition by so-called alpha blending) on the subject focusing image P1 and the non-subject focusing image P2 in accordance with a coefficient (alpha value) to be calculated by using the composition depth map DMP3 as an alpha map. In other words, the image composition unit 55 performs image composition by extracting a region in the subject focusing image P1 that corresponds to the region with the value of "1" in the composition depth map DMP3 and extracting a region in the non-subject focusing image P2 that corresponds to the region of the value of "0" in the composition depth map DMP3.

In the present embodiment, since the regions of subjects of both the subject depth map DMP1 and the non-subject depth map DMP2 are set as regions of subjects to be extracted by way of using the composition depth map DMP3 generated by the OR operation as the alpha map, a region is preferentially employed which corresponds to a subject extracted in a subject focusing image in which an subject is not blurred. Therefore, it is possible to generate data of the omnifocal image P3 without a residual image.

Then, the image composition unit 55 stores the data of the omnifocal image P3 thus generated in the composited image storage unit 72.

The output control unit 56 controls so as to output from the output unit 18 and display the data of the omnifocal image p3 generated by the image composition unit 55.

Figure 4:
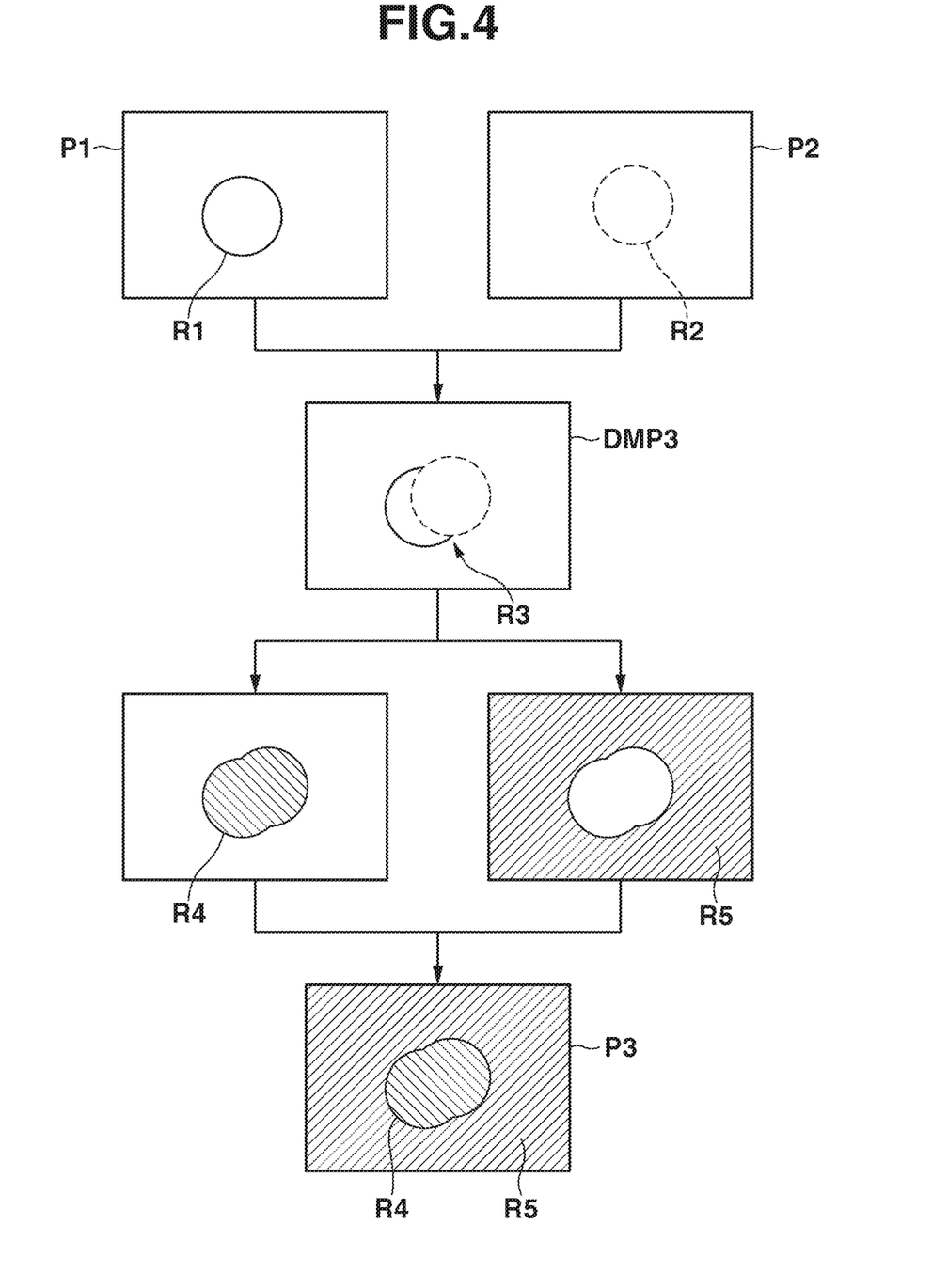
FIG. 4 is a diagram schematically showing a method for generating data of an omnifocal image.

FIG. 4 is a diagram schematically showing a method of generating data of an omnifocal image P3.

In a case of generating data of the omnifocal image P3 by the focusing bracketing photography, when a subject as a moving body is included in an image used for composition, if performing the image composition using a depth map generated from one image (for example, the subject depth map DMP1), a region of a movement amount of the moving body is not considered and this region is employed as a background, a result of which a residual image occurs in the subject of the omnifocal image P3 generated.

However, with the method of the present embodiment, as shown in FIG. 4, by employing the subject focusing image P1 and the non-subject focusing image P2, a composition depth map DMP3 is generated in which a region R3 (hereinafter, referred to as "composited subject region R3") made by compositing a subject region R1 within a subject focusing image P1 from a subject focusing image P1 with a subject region R2 within a non-subject focusing image P2 is set as a region for a subject of a moving body.

Then, a region R4 is clipped which corresponds to the composited subject region R3 in the subject focusing image P1 and a region R5 is clipped which corresponds to a region other than the composited subject region R3 in the non-subject focusing image P2 so as to correspond to the composited subject region R3 of the composition depth map DMP3. Then, each image is composited together to generate an omnifocal image P3. In other words, the omnifocal image P3 is composed of the region R4 corresponding to the composited subject region R3 of the subject focusing image P1 and the region R5 that is a region other than the composited subject region R3 of the non-subject focusing image P2.

Therefore, with reference to the example in FIG. 3, since the region for the "flower" in the non-subject focusing image P2 which becomes a moving body due to dislocating from the angle of field of the subject focusing image P1 is set as a region that is clipped from the subject focusing image P1, it is possible not to employ the region of the subject of the non-subject focusing image P2 which is blurred, a result of which it is possible to reduce the occurrence of a residual image.

In addition, by employing the present method, it is possible to reduce the influence of occlusion that may occur when a background is in focus and a subject, which becomes blurred since it is located closer, is completely separated from the background, a result of which it is possible to improve the image quality upon composition.

In other words, it becomes possible to improve the image quality of data of the omnifocal image P3 upon generation, i.e. to generate data of the omnifocal image P3 with high quality, by employing the present method.

Next, the flow of omnifocal image generation processing executed by the image capture apparatus 1 having such a functional configuration is explained.

Figure 5:
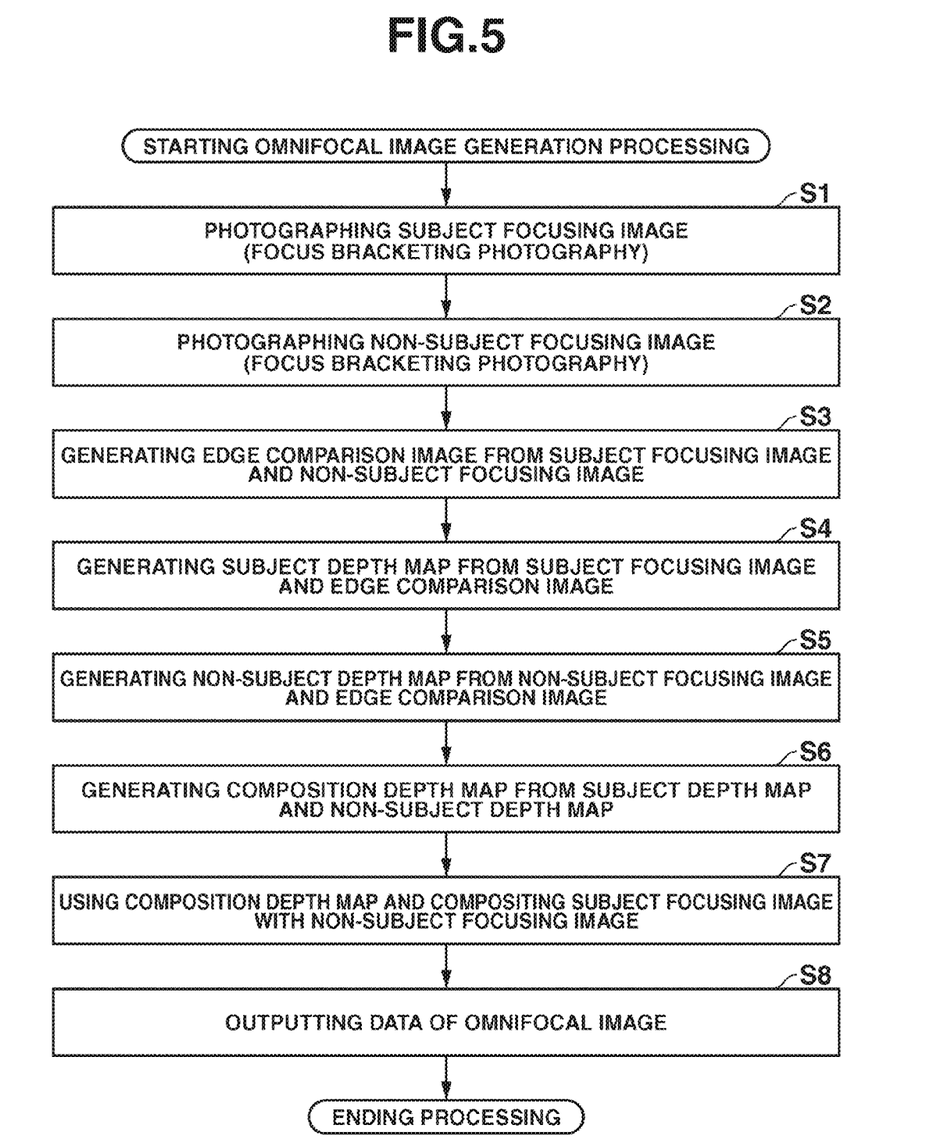
FIG. 5 is a flowchart illustrating a flow of omnifocal image generation processing executed by the image capture apparatus of FIG. 1 having the functional configuration of FIG. 2.

FIG. 5 is a flowchart illustrating the flow of omnifocal image generation processing executed by the image capture apparatus 1 of FIG. 1 having the functional configuration of FIG. 2.

Omnifocal image generation processing refers to a sequence of processing of generating data of an omnifocal image from data of a plurality of captured images each of which has a different focusing position.

The omnifocal image generation processing starts when a user performs a predetermined operation for executing the omnifocal image generation processing using the input unit 17.

In Step S1, the image capture control unit 51 performs image capture processing (focus bracketing photography) by controlling the image capture unit 16 to photograph a subject focusing image p1. In other words, the image capture control unit 51 in the example of FIG. 3 sets a flower blooming in a park as a subject and photographs the subject focusing image P1 in which the flower is in focus. Then, the captured image acquisition unit 52 acquires data of the subject focusing image P1 thus photographed and stores it in the captured image storage unit 71.

In Step S2, the image capture control unit 51 performs the image capture processing (focus bracketing photography) by controlling the image capture unit 16 and photographs a non-subject focusing image P2. In other words, the image capture control unit 51 sets the flower blooming in the park as a subject and photographs the non-subject focusing image P2 in which a landscape of the park as the background of the flower is in focus. Upon photographing the non-subject focusing image P2, the image capture control unit 51 changes a focusing position so as to focus on the landscape of the park as the background, and then performs photographing. The captured image acquisition unit 52 acquires data of the non-subject focusing image P2 thus photographed, and stores it in the captured image storage unit 71.

In Step S3, the edge comparison image generation unit 53 generates an edge comparison image composed of an edge map comparing edge strengths using the subject focusing image P1 and the non-subject focusing image P2 acquired by the captured image acquisition unit 52.

In Step S4, the image depth map generation unit 91 uses an edge comparison image generated by the edge comparison image generation unit 53 and a subject focusing image P1 acquired by the captured image acquisition unit 52, and generates a subject depth map DMP1 which corresponds to the shape of the subject in the subject focusing image P1.

In Step S5, the image depth map generation unit 91 uses an edge comparison image generated by the edge comparison image generation unit 53 and a non-subject focusing image P2 acquired by the captured image acquisition unit 52, and generates a non-subject depth map DMP2 which corresponds to the shape of the subject in the non-subject focusing image P2.

In Step S6, the composition depth map generation unit 92 generates a composition depth map DMP3 by performing processing of OR operation on the subject depth map DMP1 and the non-subject depth map DMP2 generated by the image depth map generation unit 91.

In Step S7, the image composition unit 55 composites the subject focusing image P1 with the non-subject focusing image P2 based on the composition depth map DMP3 generated by the composition depth map generation unit 92 so as to generate data of an omnifocal image P3. Then, the image composition unit 55 stores the data of the omnifocal image p3 thus generated in the composited image storage unit 72.

In Step S8, the output control unit 56 outputs to display the data of the omnifocal image P3 from the output unit 18. Then, the omnifocal image generation processing ends.

With such an image capture apparatus 1 as described above, it includes the captured image acquisition unit 52, the image depth map generation unit 91, the composition depth map generation unit 92, and the image composition unit 55.

The captured image acquisition unit 52 acquires the data of the subject focusing image P1 and the non-subject focusing image P2 with different focal points.

The image depth map generation unit 91 generates the subject depth map DMP1 and the non-subject depth map DMP2 that represent a distance relationship of a subject in an image for every pixel for each of the subject focusing image P1 and the non-subject focusing image P2 acquired.

The composition depth map generation unit 92 performs predetermined processing on the subject depth map DMP1 and the non-subject depth map DMP2 thus generated to generate the composition depth map DMP3.

The image composition unit 55 composites the data of the subject focusing image P1 with the data of the non-subject focusing image P2 based on the composition depth map DMP3 thus generated to generate the data of the omnifocal image P3.

With such an image capture apparatus 1, it is possible to generate the data of the omnifocal image P3 with less residual image even if a subject such as a flower swaying in the wind is a moving body, for example, and thus the composited image quality of the data of the omnifocal image P3 can be improved. Furthermore, it is possible to reduce the influence of occlusion that may occur when a background is in focus and a subject, which becomes blurred since it is located closer, by the subject and background being completely separated, a result of which it is possible to improve the image quality of the data of the omnifocal image p3 upon composition.

The predetermined processing by the composition depth map generation unit 92 is the processing of OR operation on the binary subject depth map DMP1 and the non-subject depth map DMP2 generated by the image depth map generation unit 91.

Therefore, with such an image capture apparatus 1, since it is simple processing, it is possible to perform processing at high speed and less processing load.

The captured image acquisition unit 52 acquires data of a plurality of images of a subject focusing image P1 photographed with a first focal point and a non-subject focusing image P2 photographed with a second focal point which is different from the subject focusing image P1.

The image depth map generation unit 91 generates the subject depth map DMP1 and the non-subject depth map DMP2 that represent in binary form whether a distance of a subject within an image for each image corresponds to a first focal point or a second focal point.

The predetermined processing by the composition depth map generation unit 92 is the processing of OR operation that preferentially determines a focal point corresponding to a moving subject between the first focal point and the second focal point if the values of the subject depth map DMP1 and the non-subject depth map DMP2 differ from each other.

Therefore, with the image capture apparatus 1, since it is possible to generate the composition depth map DMP3 establishing a region of a subject including a dislocated portion of a moving body, it is possible to generate data of the omnifocal image P3 with less residual image even if a subject is a moving body, a result of which it is possible to improve the image quality of the data of the omnifocal image P3 upon composition.

It should be noted that the present invention is not to be limited to the aforementioned embodiment, and that modifications, improvements, etc. within a scope that can achieve the object of the present invention are also included in the present invention.

In the abovementioned embodiment, although the binary depth maps DMP1 and DMP2 for images upon generating the composition depth map DMP3 are used and thus the processing is performed by the OR operation, the present invention is not limited thereto. For example, the composition depth map DMP3 may be generated by processing of selecting the maximum value of either image of the depth maps DMP1 and DMP2 when employing the depth maps DMP1 and DMP2 with images of multiple values.

More specifically, the captured image acquisition unit 52 acquires data of a plurality of images with the first focal point and the second focal point, and the image depth map generation unit 91 generates the subject depth map DMP1 and the non-subject depth map DMP2 that represent the distance of a subject within an image for each image in multiple values.

Then, in the predetermined processing by the composition depth map generation unit 92, it is possible to configure so as to perform processing of selecting the maximum value among the values for processing when employing a depth map with multiple values generated for each image.

In this way, with the image capture apparatus 1, it is possible to perform processing at high speed and less processing load by selecting the maximum value.

Furthermore, in the abovementioned embodiment, although the data of the omnifocal image P3 is generated from the data of two multifocal captured images P1 and P2, the present invention is not limited thereto. The data of the omnifocal image may be generated from data of three or more images. In this case, the data of the omnifocal image may be generated in such a way that two images acquired are composited and data of another image processed repeatedly thereafter is sequentially composited with the data of the composited image thus generated. By generating the data of the omnifocal image in this way, it is possible to generate data of an omnifocal image with higher quality and high image quality compared to the case of compositing all of the images all at once. More specifically, it can be configured such that the image composition unit 55 composites a predetermined two images among the images acquired and repeatedly composites another image processed repeatedly thereafter similarly so as to generate data of an omnifocal image.

Furthermore, in the abovementioned embodiment, although the image in which the photographing target located behind the subject (the landscape of the park) is in focus is used for a non-subject focusing image, the present invention is not limited thereto. It is acceptable as a non-subject focusing image as long as a subject is not in focus. For example, an image may be employed such as an image photographed at a hyperfocal distance, an image photographed at a distance of infinity, an image in which a photographing target in a short range is in focus (for example, a wall distant from an image capture apparatus by 50 cm), an image in which a position ahead of a subject is in focus, and the like.

Furthermore, in the abovementioned embodiment, although it is configured so that the processing of each operation is performed by pixel unit, the present invention is not limited thereto. For the purpose of reducing processing load, it may be configured so as to perform the processing of each operation not by a minimum unit, but by a predetermined block unit.

Furthermore, in the abovementioned embodiment, although the images are composited by way of alpha blending, the present invention is not limited thereto. For example, it is acceptable as long as regions that are in focus in two images can be composited, and thus various methods such as additive composition can be used.

Furthermore, in the abovementioned embodiment, although the image that is a basis for generating the data of the omnifocal image P3 is used for processing by acquiring data of a captured image by capturing by way of the image capture unit 16 therein, the present invention is not limited thereto. An image acquired may be configured by using a captured image and data of an image acquired from an external device and the like. In this case, it is necessary to acquire information necessary for generating a depth map of information relating to a positional relation of a subject within an image, or the like (for example, a distance from the image capture apparatus 1).

In the aforementioned embodiments, a digital camera has been described as an example of the image capture apparatus 1 to which the present invention is applied; however, the present invention is not particularly limited thereto.

Furthermore, the present invention can be applied to an image processing apparatus that does not have an image capture function and performs the omnifocal image generation processing based on an image captured externally. For example, the present invention can be applied to any electronic apparatus in general having the omnifocal image generation processing. More specifically, for example, the present invention can be applied to a lap-top personal computer, a printer, a television, a video camera, a portable navigation device, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any composition thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

While the present invention has been described with reference to the preferred embodiments, it is intended that the invention be not limited by any of the details of the description therein but includes all the embodiments which fall within the scope of the appended claims.

The invention claimed is:

1. An image processing apparatus comprising:
a CPU that is configured to:
acquire data of a plurality of images with different focal points;
perform first map generation to generate a depth map that represents a distance relationship of a subject, for each of a plurality of acquired images, in an image for each of a predetermined number of pixels;
perform second map generation to generate a new depth map by performing predetermined processing on a plurality of the depth maps generated in the first map generation; and
composite data of the plurality of images for each pixel according to a ratio of composition for each pixel designated by the new depth map generated in the second map generation, and generate data of an omnifocal image.

2. The image processing apparatus according to claim 1, wherein:
the CPU acquires the data of the plurality of images by photographing a plurality of times while changing a focal point;
the predetermined processing performed by the CPU in the second map generation includes processing of performing a selective operation on pixel values of two depth maps with multiple values of at least two values generated in the first map generation; and
the CPU selects a ratio of composition according to the multiple values for composition.

3. The image processing apparatus according to claim 2, wherein the ratio of composition is 0% and 100%.

4. The image processing apparatus according to claim 2, wherein:
the different focal points of the plurality of images include a first focal point and a second focal point;
the CPU generates, in the first map generation, two depth maps that represent with binary values whether a distance of a subject within an image for each of the plurality of images corresponds to the first focal point or the second focal point; and the predetermined processing performed by the CPU in the second map generation includes processing of performing a selective operation on a pixel value that preferentially determines a value corresponding to a focal point corresponding to a moving subject among a value corresponding to the first focal point and a value corresponding to the second focal point with respect to pixels having different values between the two depth maps.

5. The image processing apparatus according to claim 1, wherein the predetermined processing performed by the CPU in the second map generation includes processing of selecting a maximum value among values of two depth maps with multiple values that are at least three values generated in the first map generation.

6. The image processing apparatus according to claim 2, wherein:
   the different focal points of the plurality of images include a first focal point and a second focal point;
   the CPU generates, in the first map generation, two depth maps that represent with multiple values a distance of a subject in an image for each of the plurality of images; and
   the predetermined processing performed by the CPU in the second map generation includes processing of adding a maximum value among the values for processing when employing depth maps with multiple values generated for each of the plurality of images.

7. The image processing apparatus according to claim 1, wherein the CPU composites a predetermined two images among the images acquired, and repeatedly composites similarly another image processed repeatedly thereafter, and generates data of an omnifocal image.

8. An image processing method comprising:
   acquiring data of a plurality of images with different focal points;
   performing first map generation to generate a depth map that represents a distance relationship of a subject, for each of a plurality of acquired images, in an image for each of a predetermined number of pixels;
   performing second map generation to generate a new depth map by performing predetermined processing on a plurality of depth maps generated in the first map generation; and
   compositing data of the plurality of images for each pixel according to a ratio of composition for each pixel designated by the new depth map generated in the second map generation, and generating data of an omnifocal image.

9. A non-transitory storage medium encoded with a computer-readable program that enables a computer of a file processing apparatus to execute functions comprising:
   an acquisition function that acquires data of a plurality of images with different focal points;
   a first map generation function that generates a depth map that represents a distance relationship of a subject, for each of a plurality of images acquired by the acquisition function, in an image for each of a predetermined number of pixels;
   a second map generation function that generates a new depth map by performing predetermined processing on a plurality of depth maps generated by the first map generation function; and
   an image composition function that composites data of the plurality of images for each pixel according to a ratio of composition for each pixel designated by the new depth map generated by the second map generation function, and generates data of an omnifocal image.

* * * * *